CONTROL CIRCUIT FOR SIGNAL RECORDING
AND REPRODUCING SYSTEMS
Original Filed Nov. 29, 1944

INVENTOR.
SEMI JOSEPH BEGUN
BY
Eber J. Hyde
ATTORNEY

Patented Feb. 24, 1953 2,629,861

UNITED STATES PATENT OFFICE 2,629,861

CONTROL CIRCUIT FOR SIGNAL RECORDING AND REPRODUCING SYSTEMS

Semi Joseph Begun, Cleveland Heights, Ohio, assignor to The Brush Development Company, Cleveland, Ohio, a corporation of Ohio Original application November 29, 1944, Serial No. 565,736. Divided and this application October 11, 1947, Serial No. 779,238

7 Claims. (Cl. 340—174)

This invention pertains to control circuits for use in signal recording and reproducing systems such for example as those embodying magnetic, optic or mechanical transducer means.

This application is a division of my application Serial Number 565,736, filed November 29, 1944 for a Control Circuit for a Signal Recording and Reproducing System, which issued as Patent No. 2,439,446 on April 13, 1948, which is assigned to the same assignee as the present invention.

It is often desirable very rapidly to measure long lengths of materials with a reasonable degree of accuracy. The present invention provides measuring means which can be driven in synchronism with or by the same drive system as the materials to be measured, and the measuring means indicates the total amount of the material which passes a certain point. The material to be measured may be wound from one reel onto another reel without introducing error due to the variable diameter of the reels. Also, the speed of the drive system may be varied without introducing error into the measurement.

An object of the invention is to provide a control circuit for a signal recording and reproducing system wherein the reproducing circuit exercises a function on the recording circuit.

Another object of the invention is to provide a control circuit for a signal recording and reproducing system wherein one or more conditions of the recording circuit may be varied in accordance with one or more conditions of the reproducing circuit.

In accordance with this invention there is provided a signal recording and reproducing system which comprises a record member and signal recording means, including first and second signal input circuits, for recording on the record member. Signal reproducing means are provided for reproducing the signal from the record member. Means are provided which effect relative motion between the record member and both of the above-mentioned means. Signal altering means are connected alternatively to each of the input circuits and there is a control circuit connection from the reproducing means to the signal altering means for alternatively connecting each input circuit to the recording means in accordance with the signal reproduced from the record member.

For a better understanding of the present invention, together with other and further objects thereof, reference is had to the following description taken in connection with the accompanying drawings, and its scope will be pointed out in the appended claims.

Figure 1:
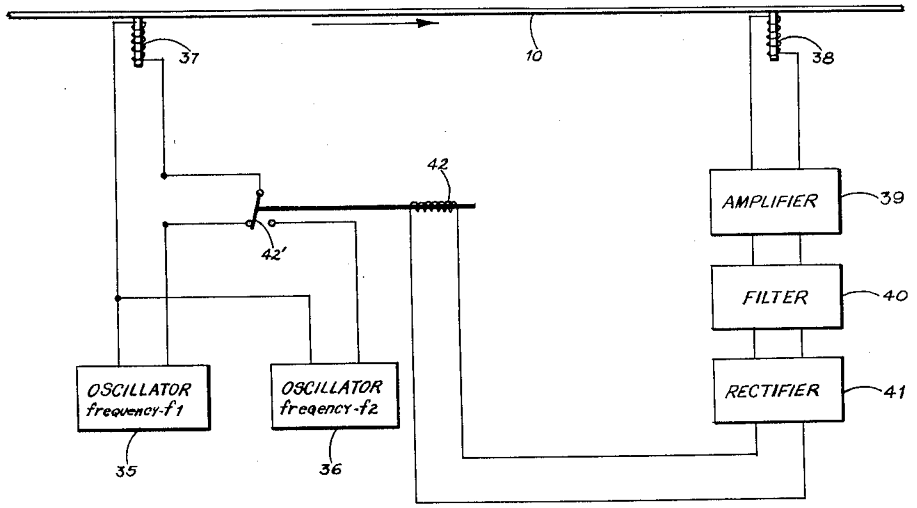
Figure 2:
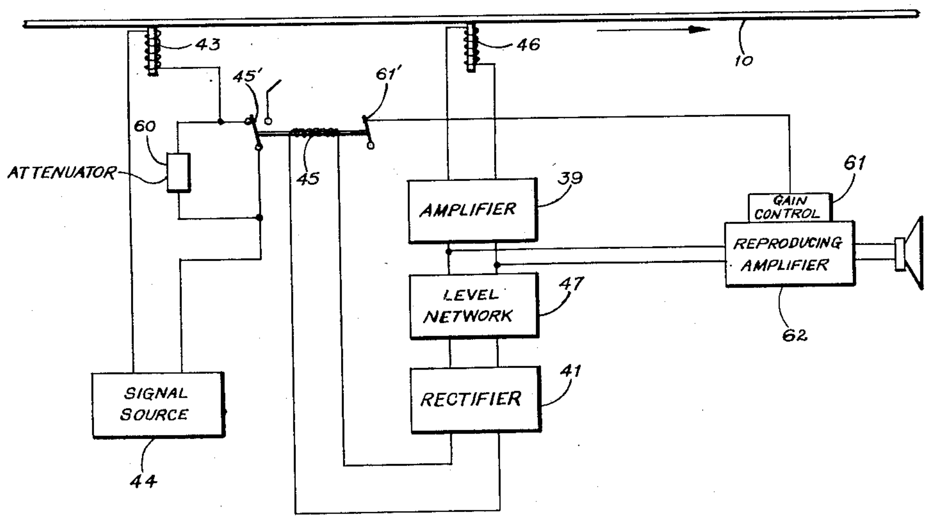

In the drawings, Fig. 1 is a simplified schematic diagram of one embodiment of the invention, and Fig. 2 is a block diagram of a different embodiment of the invention.

In the system shown in Fig. 1, two oscillators 35, 36 generating different frequencies are provided and either of them supplies current to the recording head 37 in accordance with a time sequence controlled by the reproducing circuit which actuates a switch 42' located in the recording circuit. In one position of the switch 42', the oscillator 35 is connected to the recording head 37 and, in the other position, the oscillator 36 is connected to the recording head 37.

The output from the pickup head 38 is amplified by the amplifier 39 and the amplified output is supplied to the input of a filter 40 which passes signals of a frequency $f_1$ but rejects signals of a frequency $f_2$.

The signal of one frequency which passes through the filter 40 is used, after recification by the rectifier 41, to control a relay 42. The relay 42 actuates switch 42' to cause it alternately to connect first the oscillator 35 and then the oscillator 36 to the recording head 37.

In another form of the invention, shown in Fig. 2, the recording head 43 is supplied from one or more signal sources 44 with signals of different intensity levels. One side of the circuit from the signal source 44 to the recording head 43 includes an attenuator 60 and, in parallel with the attenuator 60, there is a circuit including a switch 45'. The output from the reproducing head 46, which picks up the signal recorded on the record member 10, is amplified by an amplifier 39. The amplified signal passes through a network 47 which passes only signals of an undesirably high intensity to a rectifier 41, such as those signals which overload the record member 10. The output from the rectifier is connected to the relay 45 which opens the switch 45' in the recording circuit, causing the signal to the recording head 43 to pass through the attenuator 60 which reduces the record to a level below the overload level.

The output from the amplifier 39 is also connected to a reproducing amplifier 62, having a gain control 61, and the relay 45 is either electrically or mechanicaly connected to the gain control 61 for changing the gain of the reproducing amplifier 62 in accordance with the intensity of the signal being reproduced from the record member 10.

When the intensity of the signal being reproduced from the record member 10 reaches an intensity approaching saturation, the level network 47, depending upon its setting, passes current to the rectifier 41 and the output therefrom energizes the solenoid 45 causing it to open switch 45'. This reduces the level of the signal being recorded, as has been explained, and simultaneously through the mechanical or electrical connection 61' increases the gain of the amplifier 62 to make up for the reduced level of the recorded signal.

The reproducing head 46 is an appreciable distance away from the recording head 43. This introduces a time delay "T" in the actuation of the switch 45' after the actuating signal was recorded on the record member. "T" is a function of the distance between the heads 43 and 46 and the rate of motion of the record 10. To reduce this delay "T" to a minimum, the reproducing head 46 should be positioned close to the recording head 43 and, to reduce the effect still further, a time delay equal to "T" in duration may be introduced between the actuation of the solenoid 45 and the changing of the gain control 61. When the level of the signal source, after attenuation, drops to such an extent that the signal impressed upon the signal carrier 10 reduces the signal-to-noise ratio in an undesirable manner, the natural bias on the relay 45 closes the switch 45' thereby short-circuiting the attenuator 60. The full energy of the signal source is then supplied to the recording head 43.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A signal recording and reproducing system comprising: a record member, signal recording means for recording on said record member and including first and second signal input circuits, signal reproducing means for reproducing the recorded signal from said record member, means for effecting relative motion between said record member and both of said above-mentioned means, signal altering means connected alternatively to each of said signal input circuits, and a control circuit connection from said signal reproducing means to said signal altering means for alternatively connecting each signal input circuit to said recording means in accordance with the signal reproduced from said record member.

2. A signal recording and reproducing system in accordance with claim 1 in which said signal altering means is a switch for opening the first signal input circuit and substantially simultaneously closing the second signal input circuit.

3. A signal recording and reproducing system in accordance with claim 1 in which said signal altering means is a signal attenuator which alters the intensity of both of the signals supplied to said recording means.

4. A signal recording and reproducing system in accordance with claim 1 in which said first and second signal input circuits include two sources of signal one in each circuit only one of which is connected to said recording means at a given instant and said signal altering means is a switch which breaks a connection from said one of said signal sources to said recording means and connects the other of said signal sources to said recording means when the said signal reproducing means reproduces a recorded signal.

5. A signal recording and reproducing system comprising: a magnetizable record member, a magnetic signal recording head in flux-linkage relationship with said magnetizable record member, two signal input circuits connected to said magnetic recording head, a magnetic signal reproducing head in flux-linkage relationship with said magnetizable record member, a signal output circuit connected to said magnetic reproducing head, driving means for effecting relative motion between said magnetizable record member and said heads, signal altering means connected alternatively to each of the said signal input circuits, and a control circuit connection from said signal output circuit to said signal altering means for alternatively connecting each signal input circuit to said magnetic recording head in accordance with the signal reproduced from said magnetizable record member by said magnetic reproducing head.

6. A signal recording and reproducing system as set forth in claim 5, further characterized by said mangetizable record member comprising an endless magnetizable body, and by said driving means moving said record member in a direction from said recording head to said reproducing head.

7. A signal recording and reproducing system as set forth in claim 6, further characterized by said signal altering means comprising switch means for closing one of said signal input circuits and opening the other during the recording of a signal on said record member, said signal altering means operating upon the reproduction of said recorded signal to throw said switch means to open said closed circuit and close said open circuit.

SEMI JOSEPH BEGUN.

REFERENCES CITED

The following references are of record in the file of this patent:

UNITED STATES PATENTS

| Number | Name | Date |
|---|---|---|
| 2,338,766 | Holcomb | Jan. 11, 1944 |
| 2,385,701 | Halstead | Sept. 25, 1945 |